(12) United States Patent
Van Zee et al.

(10) Patent No.: US 7,267,218 B1
(45) Date of Patent: Sep. 11, 2007

(54) CABLE CONVEYER WITH BEARINGS

(75) Inventors: Larry J Van Zee, Oskaloosa, IA (US); Millard M Williams, Oskaloosa, IA (US)

(73) Assignee: Intraco, Inc., Oskaloosa, IA (US)

( * ) Notice: Subject to any disclaimer, the term of this patent is extended or adjusted under 35 U.S.C. 154(b) by 0 days.

(21) Appl. No.: 11/459,401

(22) Filed: Jul. 24, 2006

(51) Int. Cl.
B65G 19/22 (2006.01)

(52) U.S. Cl. ........................ 198/727; 198/733

(58) Field of Classification Search ............... 198/725, 198/727, 728, 731, 732, 733
See application file for complete search history.

(56) References Cited

U.S. PATENT DOCUMENTS

| | | | |
|---|---|---|---|
| 3,586,155 A * | 6/1971 | Turretine et al. | ........... 198/727 |
| 4,071,136 A | 1/1978 | Jones | |
| 4,195,725 A | 4/1980 | Jones | |
| 4,391,361 A | 7/1983 | Hall | |
| 4,962,847 A * | 10/1990 | Pisors et al. | ................. 198/733 |
| 5,318,168 A * | 6/1994 | Rappen | ...................... 198/733 |

FOREIGN PATENT DOCUMENTS

DE 3707990 * 1/1988 ................. 198/728

OTHER PUBLICATIONS

Pages 64, 66, 69, 70, 85, 146 and 164—also pp. 1 and 2 to show the publication is Wire Rope Users Manual, Third Edition dated 1993.

* cited by examiner

*Primary Examiner*—James R. Bidwell
(74) *Attorney, Agent, or Firm*—Sturm & Fix LLP

(57) ABSTRACT

An improved cable conveyor system in which buttons provided for pushing the conveyed material are fitted with bearings to relieve the cable of torsional stresses. As a cable is tensioned, torsional stresses are incurred, tending to unwind the braided wire. By providing an opportunity for the cable to unwind, stretching may be carried out without the usual unrelieved torsional stresses.

11 Claims, 3 Drawing Sheets

Cable Travel

CABLE CONVEYER WITH BEARINGS

CROSS REFERENCE TO RELATED APPLICATIONS

Not Applicable.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The present invention relates generally to a conveyer system. More specifically, the present invention relates to a method and apparatus for mitigating the effects of the stretching and consequent twisting of a cable that is part of a cable conveyance system.

2. Background Art

Cables, due to their flexibility, have been used in conveyance systems for some time. The usual cable conveyance system 200 is shown in FIG. 2 and comprises an endless cable having disc members or buttons 210 attached thereto at even intervals and having a diameter slightly smaller than a conduit through which the cable and button assembly 200 is pulled.

In U.S. Pat. No. 4,195,725, which is hereby incorporated by reference, a drive unit for a cable conveyer is disclosed, having an improved design allowing the driving wheel to be disposed within the material being conveyed.

In U.S. Pat. No. 4,071,136, which is hereby incorporated by reference, a channel housing is disclosed to replace cable tensioning devices used in previous cable conveyor systems.

In U.S. Pat. No. 4,391,361, which is hereby incorporated by reference, an improved hold-down apparatus for cable conveyors is disclosed.

In each of these examples, and those cable conveyer systems 200 shown in FIG. 2, the wire rope, or cable 220, may stretch under tension. A consequence of stretching is a torque due to the twisted braid of the cable 220. No relief to this torque is provided in present cable conveyor systems 200 as the cable 220 is coupled to itself in a rigid arrangement with the couplers 110 shown. Hence, rotational stresses are unrelieved to the detriment of the cable 220 and other conveyor parts.

Therefore, there is a need for a reliable cable conveyor system providing an opportunity for a tensioned cable to twist. Additionally, a mechanism to permit the cable to retwist when relieved of tension is needed.

BRIEF SUMMARY OF THE INVENTION

An object of the present invention is to provide a reliable method and apparatus for permitting a cable in a cable conveyor system to twist under tension, thereby relieving torsional stresses therein as well as enhancing the cable's stretching ability.

The cable conveyance system of the present invention comprises segments of wire rope, or cable, disposed between circular discs or buttons. The buttons are disposed in a conduit sized to permit their passage without binding, yet to disallow the conveyed substance from slipping between a button and the conduit wall. Conveyed substances include granular and powdered materials, grains, beans, and any mass of individual items or fluid that may be thereby conveyed. The present invention is not limited to a particular conveyed material.

In the preferred embodiment of the present invention, at least some of the disc members, or buttons, comprise a bearing system, providing independent rotation of each of the individual lengths of cable between the buttons having bearings. By permitting the cable to twist, stretching is enhanced, as well as the relief of internal stresses. The twist in the cable may also be returned to the cable when the tension is relieved.

Other objects, advantages and novel features of the present invention will become apparent from the following detailed description of the invention when considered in conjunction with the accompanying drawings.

DETAILED DESCRIPTION OF THE INVENTION

Figure 1:
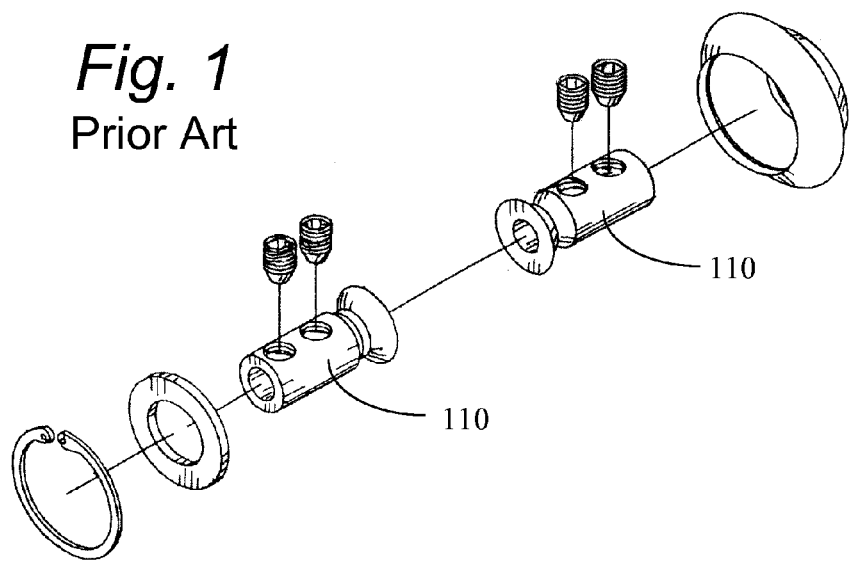
FIG. 1 is a perspective view of a prior art coupling system for a cable of a cable conveyance system.
Figure 2:
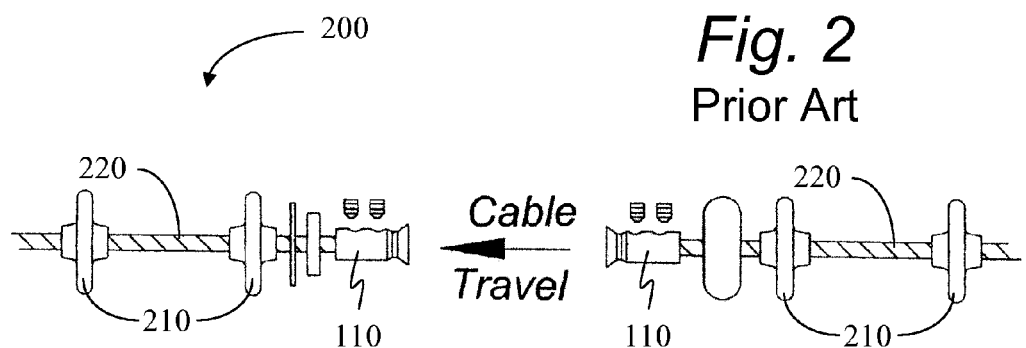
FIG. 2 is a perspective view of a prior art cable conveyance system.
Figure 3:
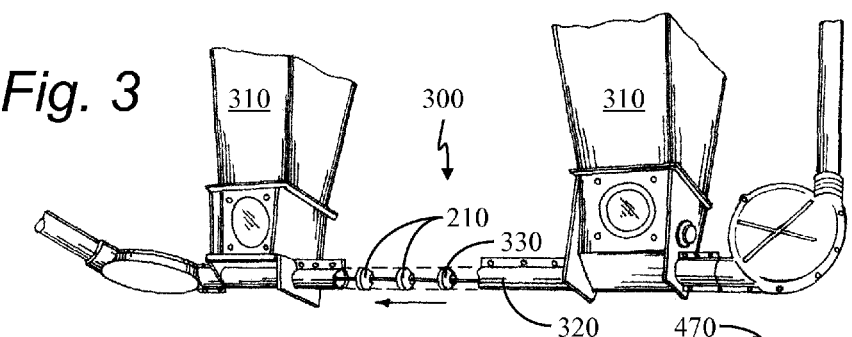
FIG. 3 is a perspective view of a cable conveyance system with some conduit in phantom.

A cable conveyance system 300 is shown in FIG. 3. Ducting, funnels, or hoppers 310 are provided for feeding the conveyed material 610 (see FIG. 6) into the cable conveyance system 300. Part of the conduit 320 is shown in phantom to display the cable 220 and buttons 210, 330 passing through the conduit 320. From the hoppers 310, the conveyed material is gravity fed into the conduit 320 and between the buttons 210, 330 where the conveyed material is captive, and conveyed along with the cable conveyor system 300.

Figure 4:
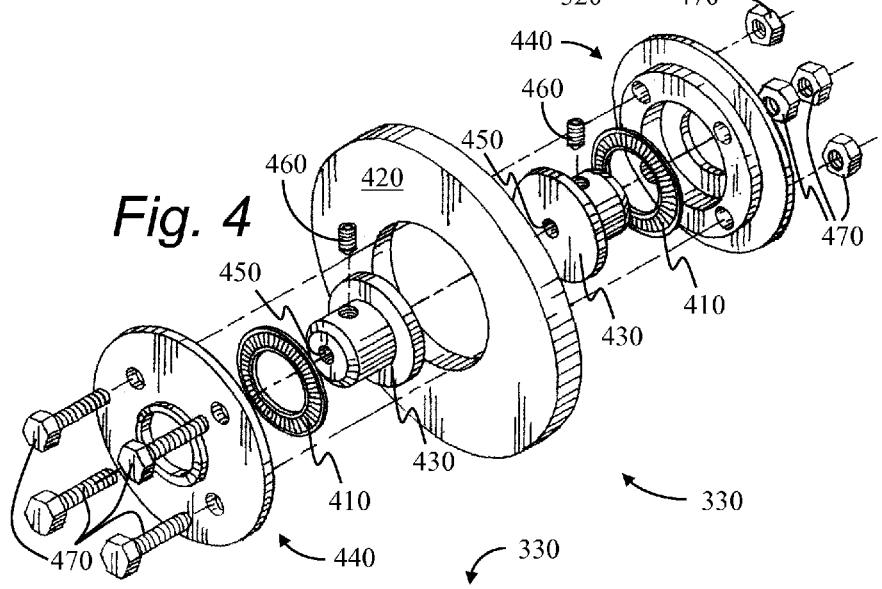
FIG. 4 is an exploded view of a bearing system for the cable conveyance system.
Figure 5:
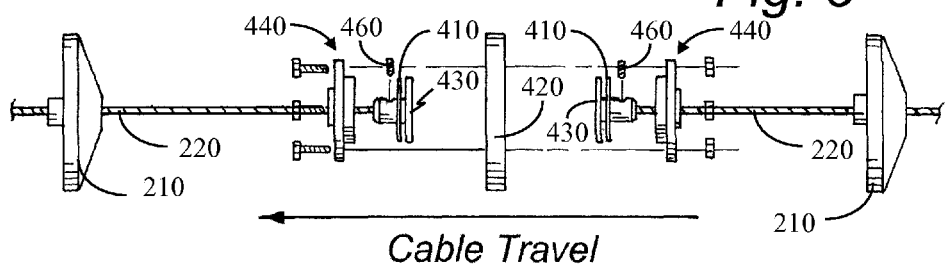
FIG. 5 is a side elevation view of a cable conveyance system.

The buttons 210, 330 include button assemblies 330, having bearings 410, as shown in FIGS. 4 and 5, to allow for cable twist during tensioning, and may additionally and optionally include standard buttons 210 having no special provision for allowing the cable 220 to twist. The bearings 410 can be, for example, roller bearings, needle bearings or ball bearings, though other types of bearings can be suitable as well.

The button assembly 330 shown in FIGS. 4 and 5, besides the bearings 410, comprises a button 420, cable clamps 430, and a hub assembly 440 that is used to hold the parts of the button assembly 330 together.

The cable clamps 430 are used to attach the cable 220 to the button assembly 330. To effect this attachment, the cable 220 is entrapped in an aperture 450 by a set screw 460. Sufficient space is provided between the two opposing cable clamps 430 within the button assembly 330 to permit each cable clamp 430 to rotate on its respective bearing 410 independently without interference from the other cable clamp 430.

The hub assembly 440 is bolted together with a plurality of threaded fasteners 470 through the entire button assembly 330. Optionally, the inside periphery of hub assembly 440 can include a groove (not shown) for holding an O-ring (not shown) that seals against the outer periphery of the bearing 410.

Figure 6:
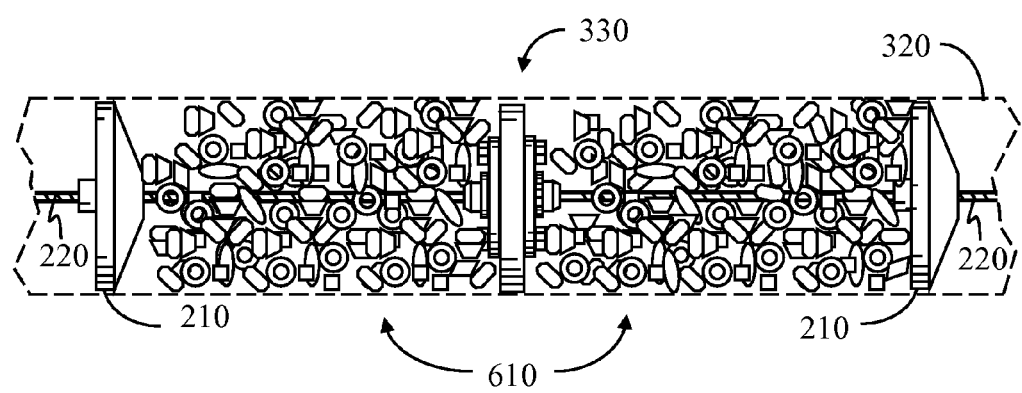
FIG. 6 is a side elevation view of a cable conveyance system including the conduit and conveyed material.

The cable conveyance system 300 is shown in FIG. 6 with conduit 320 in phantom and conveyed material 610 shown in place in the spaces between the buttons 210, 330. As the cable 220 moves from right to left in FIG. 6, the buttons 210, 330 push the conveyed material 610 along.

The above embodiment is the preferred embodiment, but this invention is not limited thereto. It is, therefore, apparent that many modifications and variations of the present invention are possible in light of the above teachings. It is, therefore, to be understood that within the scope of the appended claims, the invention may be practiced otherwise than as specifically described.

We claim:

1. A cable conveyance system for conveying conveyed material, the cable conveyance system comprising:
   a cable first end;
   a first cable clamp to which the cable first end is operatively affixed;
   a first hub plate;
   a bearing disposed between the first cable clamp and the first hub plate;
   a cable second end;
   a second cable clamp to which the cable second end is operatively affixed; and
   wherein the second cable clamp is operatively attached to the first hub plate to hold the first and second ends of the cable together and whereby the bearing will assist the first end of the first cable to rotate with respect to the second end of the second cable without excessive friction.

2. The system of claim 1 wherein the bearing is of a type that has components that move with respect to other parts thereof.

3. The system of claim 1 wherein the bearings is a rolling contact bearing.

4. A method of relieving torsional stresses in a cable used in a cable conveyance system comprising a cable having two ends, a conduit, a button assembly, said button assembly comprising a button for pushing conveyed material in the conduit, and a bearing, the method comprising:
   operatively rotatably connecting one of the two ends of the cable to the bearing such that the cable is free to rotate with the bearing;
   operatively rotatably affixing the bearing to the button;
   disposing the cable and the button assembly inside the conduit;
   permitting the two ends of the cable to rotate independently of one another;
   operatively attaching the cable to the cable clamp;
   operatively, rotatably engaging the cable clamp to the bearing;
   forming a right circular cylindrical portion of the cable clamp;
   making an orifice in the right circular cylindrical portion and coaxial therewith;
   engaging the cable into the orifice;
   forming a shoulder on a first end of the right circular cylindrical portion of the cable clamp;
   passing a second end of the right circular cylindrical portion through a center aperture of the bearing; and
   operatively, rotatably engaging the shoulder to the bearing;
   wherein the cable conveyance system includes a hub assembly including a first and a second plate, each plate comprising an aperture; a second bearing, a second cable clamp, and a second end of the cable, the method additionally comprising:
   forming a second right circular cylindrical portion of the second cable clamp;
   making a second orifice in the right circular cylindrical portion of the second cable clamp and coaxial therewith;
   engaging the second end of the cable into the second orifice;
   forming a second shoulder on a first end of the right circular cylindrical portion of the cable clamp;
   passing a second end of the second right circular cylindrical portion through a center aperture of the second bearing;
   arranging the second ends of the two right circular cylindrical portions of the two cable clamps towards one another;
   operatively engaging the second shoulder to the second bearing;
   passing the two right circular cylindrical portions of the two cable clamps through respective orifices of the first and second plates of the hub assembly; and
   operatively sandwiching the two bearings and two cable clamps between the first and second plates of the hub assembly.

5. The method of claim 4, the cable conveyance system including a threaded fastener, the method additionally comprising holding the first and second plates in position with said threaded fastener.

6. An apparatus for conveying material with a cable conveyance system, the apparatus comprising:
   a cable having at least one end;
   a bearing operatively, rotatably connected to the at least one end of the cable;
   a conduit;
   a button operatively, rotatably attached to the bearing, said button disposed in the conduit and sized to fit in the conduit, and used to push the conveyed material inside the conduit;
   a second bearing;
   a second end of the cable;
   a first cable clamp to which the at least one end of the cable is operatively engaged, the first cable clamp being engaged to the bearing;
   a second cable clamp to which the second end of the cable is operatively engaged, the second cable clamp being engaged to the second bearing;
   a first hub plate operatively engaged to the bearing; and
   a second hub plate operatively engaged to the second bearing, the two bearings, the first and second cable clamps, and the button being sandwiched between the first hub plate and the second hub plate.

7. The apparatus of claim 6 additionally comprising a cable clamp comprising a right circular cylindrical portion, a shoulder, coaxial with the right circular cylindrical portion, for engaging the bearing, and an aperture, coaxial with the right circular cylinder, for receiving the at least one end of the cable.

8. The apparatus of claim 6 additionally comprising a set screw having male threads disposed in a threaded orifice disposed orthogonal to a longitudinal axis of the aperture, said set screw being tightened down toward the aperture to hold the cable in the aperture.

9. The apparatus of claim 6 wherein a plurality of cables, bearings, and buttons are used, spaced apart on the cable conveyance system.

10. A cable conveyance system for conveying conveyed material, the cable conveyance system comprising:
 a cable first end;
 a first cable clamp to which the cable first end is operatively affixed;
 a first bearing to which the first cable clamp is engaged;
 a first hub plate to which the first bearing is engaged;
 a cable second end;
 a second cable clamp to which the cable second end is operatively affixed;
 a second bearing to which the second cable clamp is engaged;
 a second hub plate to which the second bearing is engaged; and
 the first hub plate and the second hub plate are operatively restrained to a fixed orientation one to another.

11. The system of claim 10 including a plurality of threaded fasteners attaching the first hub plate to the second hub plate.

\* \* \* \* \*